United States Patent Office
3,780,045
Patented Dec. 18, 1973

3,780,045
PREPARATION OF ORGANOLITHIUM
COMPOUNDS
Constantinos G. Screttas, Athens, Greece, assignor of a fractional part interest to The National Hellenic Research Foundation, Athens, Greece
No Drawing. Filed Aug. 29, 1972, Ser. No. 284,473
Int. Cl. C07d 29/10
U.S. Cl. 260—293.51
19 Claims

ABSTRACT OF THE DISCLOSURE

The process of lithiating an organo halide by reacting it with lithium reagent so as to replace one or more halogen atoms of the organo halide with lithium atoms and form lithium halide by-product is improved by employing as the lithium reagent an addition compound of lithium and an aromatic hydrocarbon containing at least 2 aromatic rings that are either joined together, fused together, or conjugated to each other. For example, 1,4-dichlorobenzene can be reacted in tetrahydrofuran at −50° C. with the addition compound of lithium and naphthalene to give a 93% yield of 1,4-phenylene dilithium, according to the following equation:

$$\text{p-C}_6\text{H}_4\text{Cl}_2 + 4\text{Li}^+\text{C}_{10}\text{H}_8^{-\cdot} \rightarrow \text{p-C}_6\text{H}_4\text{Li}_2 + 4\text{C}_{10}\text{H}_8 + 2\text{LiCl}$$

Organolithium compounds wherein the lithium atoms are bonded directly to carbon atoms of a hydrocarbyl group have many known uses, including, for example, usefulness as initiators for stereo-specific addition polymerization of conjugated polyenes such as isoprene and butadiene, as intermediates in preparing lithium hydride, as rocket fuel components, as metalating agents, as hydrocarbon-soluble bases in the Wittig reaction, and in other dehydrohalogenation reactions, and they are generally useful in organic synthesis. The most common method of preparing such an organolithium compound is by lithiation of the corresponding organohalide by reacting it with lithium reagent, such as metallic lithium, so as to replace one or more halogen atoms of the organohalide with lithium atoms and form lithium halide by-product, for example according to the following reaction equation wherein R represents an organo radical.

(1) $\text{RX} + 2\text{Li} \rightarrow \text{R—Li} + \text{LiX}$

Heretofore this type of reaction has required a couple of hours to complete, however, especially with long chain alkyl compounds, e.g. those having 10 or more carbon atoms, or when used to bond two lithium atoms to a single organic moiety, e.g. as in the phenylene dilithiums. Yields from this type of reaction have frequently been poor as well.

As regards dilithium compounds, attempts have also been made to prepare these by effecting a halogen-metal exchange reaction between an organomonolithium compound (e.g. phenyl lithium) and an organodihalide, according to the following general equation:

(2) $\text{XRX} + 2\text{R'—Li} \rightarrow \text{Li—R—Li} + 2\text{R'X}$

This reaction generally proceeds even more slowly than that of Equation 1, however, and yields are relatively poor.

Furthermore, with respect to the phenylene dilithium compounds, the methods heretofore used for their preparation have not been operable with chlorinated benzene starting materials but have, instead, required the use of the more expensive bromine-substituted benzenes.

Thus, a need exists for a method by which any of a variety of organolithium compounds can be prepared in shorter reaction times than a couple of hours, in good yields, and by using chlorinated starting materials, if desired.

I have now discovered that the process of lithiating an organohalide by reacting it with lithium reagent so as to replace one or more halogen atoms of the organohalide with lithium atoms, and form lithium halide by-product, can usually be completed within a few minutes, rather than hours, and in generally excellent yields, by using as the lithium reagent an addition compound of lithium and an aromatic hydrocarbon containing at least 2 aromatic rings that are either joined together, fused together, or conjugated to each other. The reaction proceeds with by-production of free aromatic hydrocarbon, for example according to the following equation:

(3) $\text{RX} + 2\text{Li}^+\text{R'}^{-\cdot} \rightarrow \text{R—Li} + 2\text{R'} + \text{LiX}$ Addition compounds of lithium and polycyclic aromatic hydrocarbons that can be used in the present process to react with the organohalide are known compounds which are formed, for example, when metallic lithium is added to a solution of the aromatic hydrocarbon in diethyl ether. (See, for instance, the discussion beginning on page 32 of the book by G. E. Coates entitled "Organo-Metallic Compounds," published in London in 1960 by Methuen Publishers.) The reaction is termed an addition reaction because it proceeds without loss of hydrogen by the hydrocarbon. Solutions of these lithium-aromatic hydrocarbon complexes have been demonstrated to contain lithium cations and hydrocarbon anions; thus the chemical formulae of the compounds are written with indication of their ionic character, as in the formula for lithium-naphthalene:

$$\text{Li}^+\text{C}_{10}\text{H}_8^{-\cdot}$$

As stated above, the aromatic hydrocarbon portion of the lithium-hydrocarbon addition compound used in the present process must contain at least 2 aromatic rings that are either joined together (as in biphenyl), fused together (as in naphthalene and anthracene), or conjugated to each other (as in 1,4-diphenylbutadiene-1,3—i.e., $$\phi\text{—CH=CH—CH=CH—}\phi)$$

It may often be preferred to use those lithium-aromatic hydrocarbon addition compounds which contain from 2 to 4 aromatic rings and up to 40 or 50 carbon atoms. The most preferred addition compound for use in the present process in lithium-naphthalene.

The improved process of the present invention, as indicated above, can be used to lithiate organohalides whether they have one or several halogen atoms, whether they be chlorides, fluorides, bromides, whether they be cyclic or acyclic, saturated or aliphatically- or aromatically-unsaturated, straight chain or branched chain, monomeric or polymeric, whether the halogen atoms be attached to carbon atoms that are bonded to one, two, or three other carbon atoms, whether the halogen atoms be attached to saturated or aliphatically- or aromatically-unsaturated carbon atoms, and whether the organic moiety of the organohalide be hydrocarbonaceous or non-hydrocarbonaceous. As examples, then, of just some of the organohalides that can be lithiated according to the improved process of the present invention may be mentioned β-chlorostyrene; 1-chlorohexene-1; 1-chloro-5-phenylpentene-1; 1,8-difluorooctene-1; chlorinated polystyrene resins; chlorobenzene; chlorocyclohexane; 1-chlorooctadecane; 1,2-dichlorobenzene; N-methyl-4-chloropiperidine; and triphenylchloromethane. It may often be desirable to employ the improvement of the present invention when lithiating organohalides having 1 to 50, e.g. 6 to 30, carbon atoms and 1 or 2 halogen atoms.

It is particularly significant that ortho-dihalobenzenes can be lithiated by the process of the present invention to make 1,2-phenylene dilithium, a compound which, to the best of my knowledge, has not been obtainable by prior art methods.

As can be seen from reaction Equation 3, above, the amount of lithium-hydrocarbon addition compound that is stoichiometrically required according to the present process to convert all of the organohalide reactant to the corresponding organic lithium compound is 2 moles for each atomic equivalent of halogen that is provided by the organohalide reactant. It is preferred, then, to use at least that amount of lithium-hydrocarbon addition compound in the present process.

Reaction temperatures employed in the process of the present invention can vary considerably, depending on the particular reactants used, but will generally be in the range of about −80° C. to about +30° C. As is known in the art, when preparing dilithium compounds in an ether solvent there is a tendency for the dilithium product to react upon and cleave the ether linkage, and this tendency is heightened as the reaction temperature is raised. Accordingly, it is generally preferred in such systems not to use reaction temperatures above about 0° C.

The reaction of the present invention is preferably carried out with the reactants dispersed in an inert solvent, such as a non-aromatic ether. The most preferred solvents are saturated, aliphatic ethers such as tetrahydrofuran; tetrahydropyran; dioxane; 1,2-dimethoxyethane; 1-methoxy-2-dimethyl aminoethane; and dimethylether.

Recovery of the organolithium compounds from the reaction mixtures produced by the process of the present invention can be known solvation and distillation techniques. Where the reaction is conducted in an ether solvent, for example, the lithium halide by-product can be removed by filtration, leaving an ether solution of the organolithium compound and the aromatic hydrocarbon by-product, which solution can then be distilled under reduced pressure to remove the reaction solvent. Extraction of the residue with benzene leaves solid organolithium product, free of aromatic hydrocarbon and lithium halide.

The process of the present invention has especial value for the preparation of phenylene dilithiums and in the conversion of alkyl chlorides and fluorides having 10 or more carbon atoms to the corresponding alkyl lithium compounds, since my reactions with these compounds can be performed to completion in only a few minutes, or even instantaneously, whereas prior methods have required reaction times of a couple of hours or more.

The invention will be better understood by reference to the following examples, which are offered for illustrative purposes only and not for limiting the invention.

EXAMPLES

Listed in the following table are the conditions and results of ten different reactions that were conducted to lithiate different organohalides according to the process of the present invention. Each reaction was conducted by adding either 2.5 or 5 millimoles of the organohalide reactant (2.5 for the dihalides, 5 for the monohalides—thus providing 5 milliatomic equivalents of halogen in each instance) to 10 ml. of a 1.0 molar tetrahydrofuran solution of lithium-naphthalene addition compound (thus providing 10 millimoles of the addition compound) and stirring the mixture at the indicated temperature for about 5 minutes. The yield of organolithium compound was then determined by carbonating and hydrolyzing the product solution to replace the carbon-bonded lithium atoms with carboxyl groups, isolating and weighing the resultant carboxylic acid, and qualitatively analyzing the acid by nuclear magnetic resonance spectroscopy.

REACTION EXAMPLES

| Example number | Organohalide reactant | Mixing temp., °C. | Organolithium product | Yield, percent |
|---|---|---|---|---|
| I | Triphenylchloromethane | 20 | Triphenylmethyl lithium ($\phi_3$C-Li) | 70 |
| II | Chlorobenzene | −50 | Phenyl lithium ($\phi$-Li) | 85 |
| III | do | 0 | Phenyl lithium ($\phi$-Li) | 89 |
| IV | Fluorobenzene | −50 | Phenyl lithium ($\phi$-Li) | 91 |
| V | Chlorocyclohexane | −50 | Cyclohexyl lithium ($C_6H_{11}$-Li) | 70 |
| VI | 1-chlorooctadecane | −50 | 1-octadecyl lithium ($CH_3(CH_2)_{17}$-Li) | 90 |
| VII | 1,2-dichlorobenzene | −50 | 1,2-phenylene dilithium 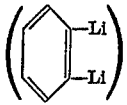 | 73 |
| VIII | 1,3-dichlorobenzene | −50 | 1,3-phenylene dilithium 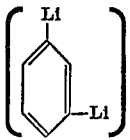 | 94 |
| IX | 1,4-dichlorobenzene | −50 | 1,4-phenylene dilithium 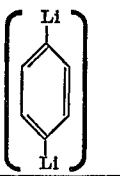 | 93 |
| X | N-methyl-4-chloropiperidine | −50 | 4-(N-methylpiperidinyl) lithium $\left(CH_3-N\diagdown\begin{array}{c}CH_2-CH_2\\CH_2-CH_2\end{array}\diagup CH-Li\right)$ | 87 |

I claim:
1. In the process of lithiating an organohalide selected from the group consisting of organo chlorides, fluorides, and bromides by reacting it with lithium reagent so as to replace one or more chloride, fluoride or bromide atoms of the organohalide with lithium atoms, and form lithium chloride, fluoride or bromide by-product, the improvement wherein the lithium reagent employed is an addition compound of lithium and an aromatic hydrocarbon containing at least 2 aromatic rings that are either joined together, fused together, or conjugated to each other, and the reaction is conducted at a temperature in the range of about $-80°$ C. to about $+30°$ C.

2. The process of claim 1 wherein the reaction is conducted with the reactants dispersed in a non-aromatic ether solvent.

3. The process of claim 2 wherein the solvent is a saturated, aliphatic ether.

4. The process of claim 1 wherein the addition compound is the addition compound of lithium and naphthalene.

5. The process of claim 3 wherein the addition compound is the addition compound of lithium and naphthalene.

6. The process of claim 1 wherein the halogen atom or atoms of the organohalide are selected from the group consisting of fluorine and chlorine and the amount of the addition compound used in the reaction is at least 2 moles for each atomic equivalent of halogen that is provided by the organo halide reactant.

7. The process of claim 1 wherein the organohalide is a dichlorobenzene and the addition compound is the addition compound of lithium and naphthalene.

8. The process of claim 7 wherein the reaction is conducted with the reactants dispersed in a solvent selected from the group consisting of tetrahydrofuran, tetrahydropyran, dioxane, 1,2-dimethoxyethane, dimethyl ether, and 1 - methoxy-2-dimethylaminoethane, and there is used at least 4 moles of the addition compound per mole of the dichlorobenzene.

9. The process of claim 1 wherein the organohalide is a haloalkane having 6 to 30 carbon atoms wherein the halogen atoms or atoms are selected from the group consisting of chlorine and fluorine, and the addition compound is the addition compound of lithium and naphthalene.

10. The process of claim 9 wherein the reaction is conducted with the reactants dispersed in a solvent selected from the group consisting of tetrahydrofuran, tetrahydropyran, dioxane, 1,2-dimethoxyethane, dimethyl ether, and 1 - methoxy-2-dimethylaminoethane, and there is used at least 2 moles of the addition compound per atomic equivalent of halogen provided by the haloalkane.

11. The process of claim 1 wherein the organohalide is chlorobenzene.

12. The process of claim 1 wherein the organohalide is 1,4-dichlorobenzene.

13. The process of claim 1 wherein the organohalide is N-methyl-4-chloropiperidine.

14. The process of claim 1 wherein the organohalide is 1,3-dichlorobenzene.

15. The process of claim 1 wherein the organohalide is 1-chlorooctadecane.

16. The process of claim 1 wherein the organohalide is chlorocyclohexane.

17. The process of claim 1 wherein the organohalide is fluorobenzene.

18. The process of claim 1 wherein the organohalide is triphenylchloromethane.

19. The process of claim 1 wherein the organohalide is 1,2-dichlorobenzene.

References Cited
UNITED STATES PATENTS

| | | | |
|---|---|---|---|
| 3,170,903 | 2/1965 | Stearns | 260—94.2 M |
| 3,660,536 | 5/1972 | Ayano et al. | 260—880 R |

OTHER REFERENCES

Engelsma et al., Rec. Trav. Chim. 80, 537–44 (1961); Chem. Abstracts (1962).

Winkler et al., J. Org. Chem. 28(7), 1733–40 (1963).

ALAN L. ROTMAN, Primary Examiner

G. T. TODD, Assistant Examiner

U.S. Cl. X.R.

260—665 R